US012110733B2

(12) United States Patent
Nana

(10) Patent No.: US 12,110,733 B2
(45) Date of Patent: Oct. 8, 2024

(54) THRESHOLD SILL WITH REMOVABLE BARRIER INSERT

(71) Applicant: NANA WALL SYSTEMS, INC., Corte Madera, CA (US)

(72) Inventor: Ebrahim Nana, Corte Madera, CA (US)

(73) Assignee: NANA WALL SYSTEMS, INC., Corte Madera, CA (US)

( * ) Notice: Subject to any disclaimer, the term of this patent is extended or adjusted under 35 U.S.C. 154(b) by 154 days.

(21) Appl. No.: 17/495,323

(22) Filed: Oct. 6, 2021

(65) Prior Publication Data

US 2022/0025698 A1 Jan. 27, 2022

Related U.S. Application Data

(63) Continuation of application No. 16/421,579, filed on May 24, 2019, now Pat. No. 11,174,673.

(51) Int. Cl.
*E06B 1/70* (2006.01)
*E06B 7/23* (2006.01)

(52) U.S. Cl.
CPC .............. *E06B 1/70* (2013.01); *E06B 7/2316* (2013.01)

(58) Field of Classification Search
CPC ................................ E06B 7/2316; E06B 1/70
See application file for complete search history.

(56) References Cited

U.S. PATENT DOCUMENTS

| | | | | |
|---|---|---|---|---|
| 2,181,812 A * | 11/1939 | Kammerer | ........ E04F 15/02166 | 52/181 |
| 2,575,657 A * | 11/1951 | Curley | ...................... E06B 1/70 | 49/490.1 |
| 2,851,744 A | 9/1958 | Oehmig | | |
| 2,853,749 A * | 9/1958 | West | ..................... E06B 7/2316 | 49/499.1 |
| 2,926,401 A | 3/1960 | Place | | |
| 2,947,043 A | 8/1960 | Asle | | |
| 3,003,203 A | 10/1961 | Edward | | |
| 3,004,308 A | 10/1961 | Young | | |
| 3,061,896 A * | 11/1962 | Wahlfeld | .................. E06B 1/70 | 49/499.1 |

(Continued)

FOREIGN PATENT DOCUMENTS

| | | |
|---|---|---|
| CA | 2753768 | 4/2012 |
| CA | 2710278 | 9/2012 |

(Continued)

OTHER PUBLICATIONS

Examination Report issued in Appl. No. EP20176078.2 (Oct. 6, 2022).

(Continued)

*Primary Examiner* — Marcus Menezes
(74) *Attorney, Agent, or Firm* — Barnes & Thornburg LLP; G. Peter Nichols

(57) ABSTRACT

A threshold sill seal assembly useful with glass wall systems is described. The assembly has a sill with a top surface. The threshold sill assembly includes a removable barrier insert that is removably engaged with a cavity provided in the top surface of the sill and has a portion substantially parallel to the movable glass wall that can act as a barrier to the intrusion of environmental conditions.

3 Claims, 19 Drawing Sheets

(56) References Cited

U.S. PATENT DOCUMENTS

| | | | | | |
|---|---|---|---|---|---|
| 3,118,192 | A * | 1/1964 | West | E06B 7/2316 | 49/499.1 |
| 3,148,419 | A * | 9/1964 | Straus | E06B 7/2316 | 49/469 |
| 3,374,579 | A * | 3/1968 | Neff | E06B 7/2316 | 49/468 |
| 3,667,192 | A * | 6/1972 | Sewell | E06B 1/70 | 49/467 |
| 3,854,245 | A | 12/1974 | Anderson | | |
| 3,900,967 | A * | 8/1975 | Bursk | E06B 7/231 | 49/471 |
| 4,003,162 | A * | 1/1977 | Britt | E06B 1/70 | 49/482.1 |
| 4,074,464 | A * | 2/1978 | McCay | E06B 1/70 | 49/468 |
| 4,104,830 | A * | 8/1978 | Eagle | E06B 1/70 | 49/468 |
| 4,352,258 | A | 10/1982 | Bursk | | |
| 4,387,535 | A * | 6/1983 | Corbo | E06B 1/70 | 49/468 |
| 4,513,536 | A | 4/1985 | Giguere | | |
| 5,029,911 | A * | 7/1991 | Daniels | E05C 19/002 | 49/467 |
| 5,524,391 | A * | 6/1996 | Joffe | E06B 1/524 | 49/467 |
| 5,673,517 | A | 10/1997 | Stanclift | | |
| 6,052,949 | A | 4/2000 | Procton et al. | | |
| 6,170,212 | B1 * | 1/2001 | Suchyna | E04F 15/10 | 52/471 |
| 6,345,477 | B1 | 2/2002 | Kepler et al. | | |
| 7,930,856 | B2 | 4/2011 | Hooper | | |
| 8,074,699 | B2 | 12/2011 | Jones et al. | | |
| 8,230,646 | B2 | 7/2012 | McDaniel | | |
| 8,393,115 | B2 | 3/2013 | Schroder | | |
| 9,816,311 | B2 * | 11/2017 | Reyes | E06B 1/70 | |
| 9,863,183 | B2 | 1/2018 | Johnson et al. | | |
| 10,113,357 | B2 | 10/2018 | Gillen | | |
| 10,745,961 | B2 * | 8/2020 | Geier | E06B 7/2307 | |
| 11,174,673 | B2 * | 11/2021 | Nana | E06B 1/70 | |
| 2002/0069589 | A1 | 6/2002 | Bennett | | |
| 2002/0129557 | A1 * | 9/2002 | Young | E06B 1/70 | 49/468 |
| 2006/0225364 | A1 | 10/2006 | Chen | | |
| 2007/0272372 | A1 | 11/2007 | Glover | | |
| 2009/0241428 | A1 | 10/2009 | Hooper | | |
| 2010/0192467 | A1 | 8/2010 | McDaniel | | |
| 2010/0192469 | A1 * | 8/2010 | McDaniel | E06B 1/70 | 49/471 |
| 2010/0257789 | A1 | 10/2010 | Meeks | | |
| 2010/0325982 | A1 | 12/2010 | Bogenhagen et al. | | |
| 2011/0047884 | A1 | 3/2011 | Schroder | | |
| 2012/0085037 | A1 | 4/2012 | Van Camp et al. | | |
| 2013/0091776 | A1 | 4/2013 | Van Camp et al. | | |
| 2013/0199101 | A1 * | 8/2013 | Rager-Frey | E06B 1/70 | 49/469 |
| 2013/0199102 | A1 * | 8/2013 | Rager-Frey | E06B 7/14 | 49/469 |
| 2015/0284988 | A1 | 10/2015 | Kadavy et al. | | |
| 2017/0016268 | A1 * | 1/2017 | Reyes | E06B 1/70 | |
| 2017/0298676 | A1 | 10/2017 | Wilhelm et al. | | |
| 2017/0299347 | A1 * | 10/2017 | Fultz | F41H 5/263 | |
| 2018/0135347 | A1 * | 5/2018 | Geier | E06B 7/2307 | |
| 2018/0355665 | A1 | 12/2018 | Seuberling | | |
| 2022/0025698 | A1 * | 1/2022 | Nana | E06B 1/70 | |

FOREIGN PATENT DOCUMENTS

| | | | | |
|---|---|---|---|---|
| CA | 2771705 | | 9/2012 | |
| CA | 2832546 | | 6/2014 | |
| CA | 2954229 | | 7/2017 | |
| DE | 102007028465 | | 12/2018 | |
| EP | 017732 | | 10/1980 | |
| EP | 0495682 | | 7/1992 | |
| EP | 1298277 | | 4/2003 | |
| EP | 1679421 | | 7/2006 | |
| EP | 2281990 | | 2/2011 | |
| EP | 2631406 | | 8/2013 | |
| EP | 3095945 | | 11/2016 | |
| GB | 1111784 | | 5/1968 | |
| GB | 2087462 | | 5/1982 | |
| GB | 2224299 | A * | 5/1990 | E06B 1/70 |
| GB | 2247267 | | 2/1992 | |
| GB | 2291913 | | 2/1996 | |
| GB | 2499840 | | 9/2013 | |
| WO | 2001/073249 | | 10/2001 | |
| WO | 2003/106798 | | 12/2003 | |
| WO | 2013/113914 | | 8/2013 | |
| WO | 2017/157517 | | 9/2017 | |

OTHER PUBLICATIONS

Extended European Search Report issued in Appl. No. EP20176078.2 (2020).

* cited by examiner

THRESHOLD SILL WITH REMOVABLE BARRIER INSERT

This application is a continuation of and claims priority to U.S. patent application Ser. No. 16/421,579, filed May 24, 2019, the entire contents of which are incorporated herein by reference.

This disclosure relates to entryways or thresholds and more particularly to entryways or threshold sills with a removable barrier insert such that when the removable barrier insert is engaged with the sill, a barrier to environmental (air, rain, wind, sound) conditions. In some instances, the threshold may comply with the Americans with Disabilities Act (ADA) Standards for Accessible Design.

BACKGROUND

The addition of large exterior wall openings incorporating multiple folding doors or glass walls has become desirable on many elaborate homes, office buildings, open-air malls and similar structures. With large openings, conventional thresholds with weather seals or doors having attached weather seals are not functionally or aesthetically desirable. In addition and in some instances, accessible sills are used to provide easier access to entryways or thresholds by handicapped individuals in wheelchairs.

With each of these thresholds, controlling leakage of air, rain, wind and sound in the area where the door or glass wall is adjacent to the threshold sill. Thus, there is a need for a threshold sill that provides a barrier to environmental conditions.

SUMMARY

A threshold sill seal assembly is described. The assembly may be useful with glass wall systems. In some instances, the threshold sill has a top surface that is substantially parallel to the floor. The threshold sill assembly includes a removable barrier insert that is removably engaged with a cavity provided in the top surface of the sill. When inserted into the cavity, the removable barrier insert has a portion that is substantially parallel to the movable glass wall and can act as a barrier (or dam) to the intrusion of environmental conditions, i.e., water, air, sound.

In some instances, the threshold sill assembly has a lower portion partially recessed within a floor and a top surface that is spaced from (e.g., above) and substantially parallel to the floor. One side of the threshold sill has a first ramp with a distal end adjacent to the floor and a proximal end adjacent the top surface of the sill. The other (opposite) side of the threshold sill has a second ramp spaced from and opposite to the first ramp. The second ramp has a distal end adjacent to the floor and a proximal end adjacent the top surface of the threshold sill. In one embodiment, the each or both the first and second ramp has a slope equal to or less than 1:48 or a slope equal to or less than 1:2. In another embodiment, each or both the first and second ramp are not slope but are co-linear with the top surface of the threshold sill. In this instance, the top surface of each or both the first and second ramp is spaced a distance equal to or less than 0.25 inch from the floor.

The threshold sill also includes a removable barrier insert that is removably engaged with a cavity provided in the top surface of the sill near the proximal end of the first ramp. When inserted into the cavity, the removable barrier insert has a portion that is substantially parallel to the movable glass wall and can act as a barrier (or dam) to the intrusion of environmental conditions, i.e., water, air, sound.

For example, in a blowing rain, the portion of the removable barrier insert that is substantially parallel to the movable glass wall is able to stop water that might otherwise blow beneath the door or wall glass and into a building. Water blocked by the portion that is substantially parallel to the movable glass wall can be directed to a contain-and-drain water management system (not shown) that directs the water to the outside of the entryway and drains it away. Thus, when the barrier insert is engaged with the threshold sill, the threshold sill can be assigned or attain a rated water performance higher than LW.

According to the disclosed threshold sill assembly, a threshold sill is provided that, when the removable barrier insert is engaged with the threshold sill, exhibits a higher rated water performance. Yet, when the removable barrier insert is not engaged, the threshold sill can provide an accessible threshold that meets the ADA requirements. These and other features, aspects, and advantages will be better understood upon review of the detailed description set forth below, taken in conjunction with the drawing figures, which are briefly described as follows.

BRIEF DESCRIPTION OF THE DRAWINGS

The following description accompanies the drawings, all given by way of non-limiting examples that may be useful to understand how the described threshold sill assembly may be embodied.

DESCRIPTION

Figure 1:
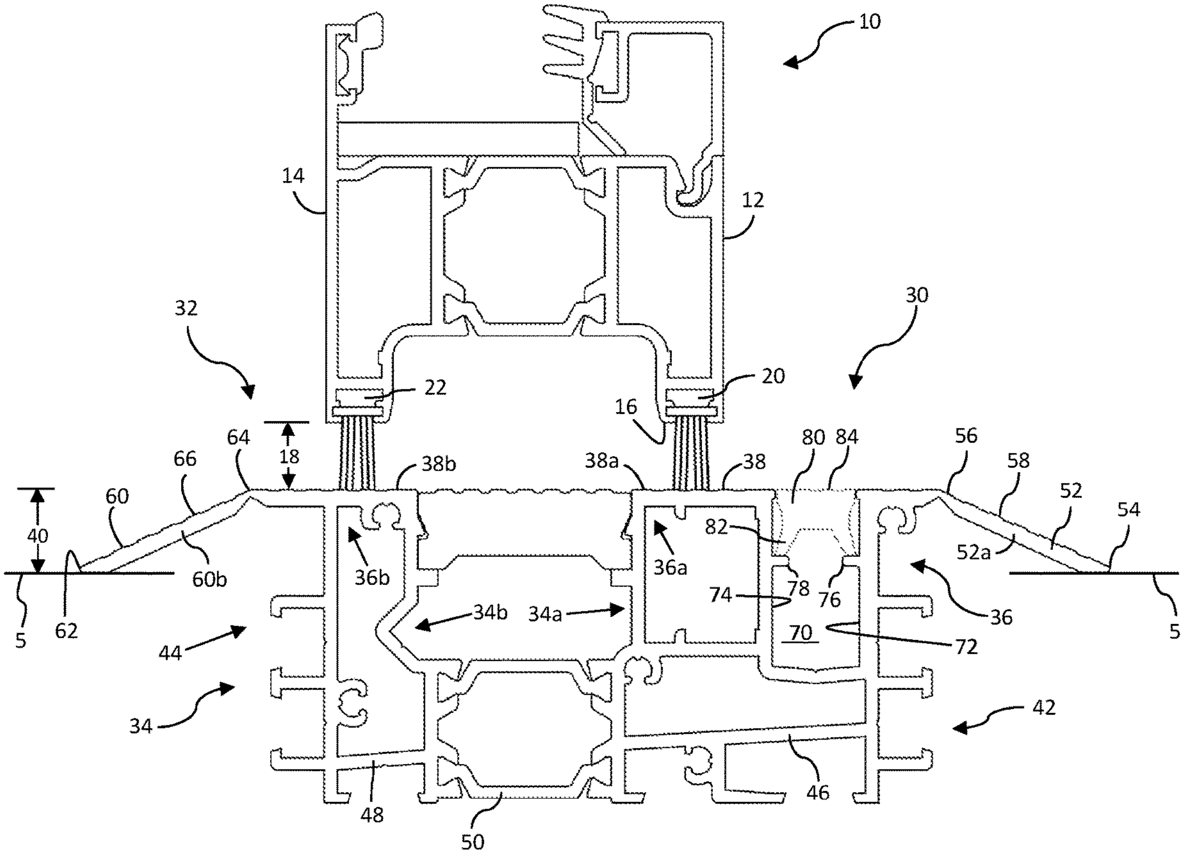
FIG. 1 is a side cross sectional view of one embodiment of the threshold sill assembly that shows one embodiment of a glass wall and shows a top surface insert engaged with the sill assembly.

Glass wall systems are increasingly popular and there are several types. For example, there are folding glass walls that may be top hung or floor supported with inward and outward openings. Turning now to FIG. 1, a threshold sill assembly 30 is shown in cooperation with a glass wall 10. Only the bottom portion of the glass wall 10 is shown. The glass wall 10 has a first side 12 and a second side 14, with the first side 12 defining an interior side and the second side 14 defining an exterior side. Of course, the designation of interior and exterior are for relational purposes only. The glass wall 10 has a bottom edge 16 from which optional first 20 and second 22 weather strips extend downward.

The threshold sill assembly 30 includes a threshold sill (or simply sill) 32 with a lower portion 34 that is partially recessed within a floor surface 5 and an upper portion 36 that extends above the floor surface 5 and terminates in a top surface 38 that is substantially parallel to the floor surface 5. The top surface 38 is spaced from the floor 5 a distance 40 equal to or less than about 0.75 inches, in some cases is spaced from the floor 5 a distance equal to or less than about 0.5 inches, and in some cases is spaced from the floor 5 a distance equal to or less than about 0.25 inches.

Generally, the bottom edge 16 of the glass wall 10 is spaced from the top surface 38 of the sill a distance 40 from about 0.125 inches to about 1 inch. The first 20 and second 22 weather strip may be removably engaged with the bottom edge 16 of the glass wall 10. The first 20 and second 22 weather strip extend from the bottom edge 16 and each has a distal end that is adjacent to the top surface 38 of the sill 32 and, in some instances, abuts the top surface 38 of the sill.

The threshold sill assembly 30 typically has a length or extends the entire span of the entryway being serviced by the glass walls 10. In some instances, the threshold sill assembly 30 may have a single continuous length or may be formed from smaller threshold sills 32 arranged end to end to form a threshold sill assembly 30 that extends the entire span of the entryway.

On one side 42 of the threshold sill 32, a first ramp 52 is provided with a distal end 54 adjacent the floor surface 5 and a proximal end 56 that is adjacent to and may be contiguous with the top surface 38. The first ramp 52 has a slope no greater than 1:48 and in some cases has a slope of about 1:2 or less. On the other (second) side 44 of the threshold sill 32, a second ramp 60 is provided with a distal end 62 adjacent the floor surface 5 and a proximal end 64 that is adjacent to and may be contiguous with the top surface 38. The second ramp 60 has a slope no greater than 1:48 and in some cases has a slope of about 1:2 or less.

In some embodiments, the threshold sill 30 is formed from two pieces. The first piece 46 includes a lower portion **34*a* that is partially recessed within a floor surface 5 and an upper portion 36*a* that extends above the floor surface and terminates in a top surface 38*a* that is substantially parallel to the floor surface 5. The top surface 38*a* is spaced from the floor 5 a distance as described above. In addition, the first piece 46 includes the first ramp 52*a*** with the sloping parameters described above.

The second piece 48 is spaced from and joined to the first piece 46 by one or more joining pieces 50. The second piece 48 includes a lower portion **34*b* that is partially recessed within a floor surface 5 and an upper portion 36*b* that extends above the floor surface 5 and terminates in a top surface 38*b* that is substantially parallel to the floor surface 5 and aligned with the top surface 38*b* of the first piece 46. The top surface 38*b* of the second piece is spaced from the floor 5 substantially the same distance as the top surface 38*a* of the first piece. In addition, the second piece 48 includes the second ramp 60*b*** with the sloping parameters described above.

The threshold sill 30 includes a cavity 70 provided in the top surface 38 near the proximal end 56 of the first ramp 52. The cavity 70 includes at least two spaced apart walls, i.e., a first wall 72 and a second wall 74 that extend normal to the top surface 38. Each wall 72, 74 may contain at least one retaining nub or rib 76, 78 that extends from the respective wall 72, 74 into the cavity 70.

As seen in FIG. 1, a removable sill or top surface insert 80 is provided to be removably engaged in the cavity 70. When inserted, the removable sill or top surface insert 80 has a pair of legs 82 that extend into the cavity 70 to contact and rest upon the respective retaining nubs or ribs 76, 78. The removable sill or top surface insert 80 has a top surface 84 that is aligned and contiguous with the top surface 38 of the sill 32. The removable sill or top surface insert 80 may have any suitable length such that the removable or top surface insert 80 or any number of removable sill or top surface inserts 80 arranged end to end span the length of the threshold sill 30 or sills.

Figure 2:
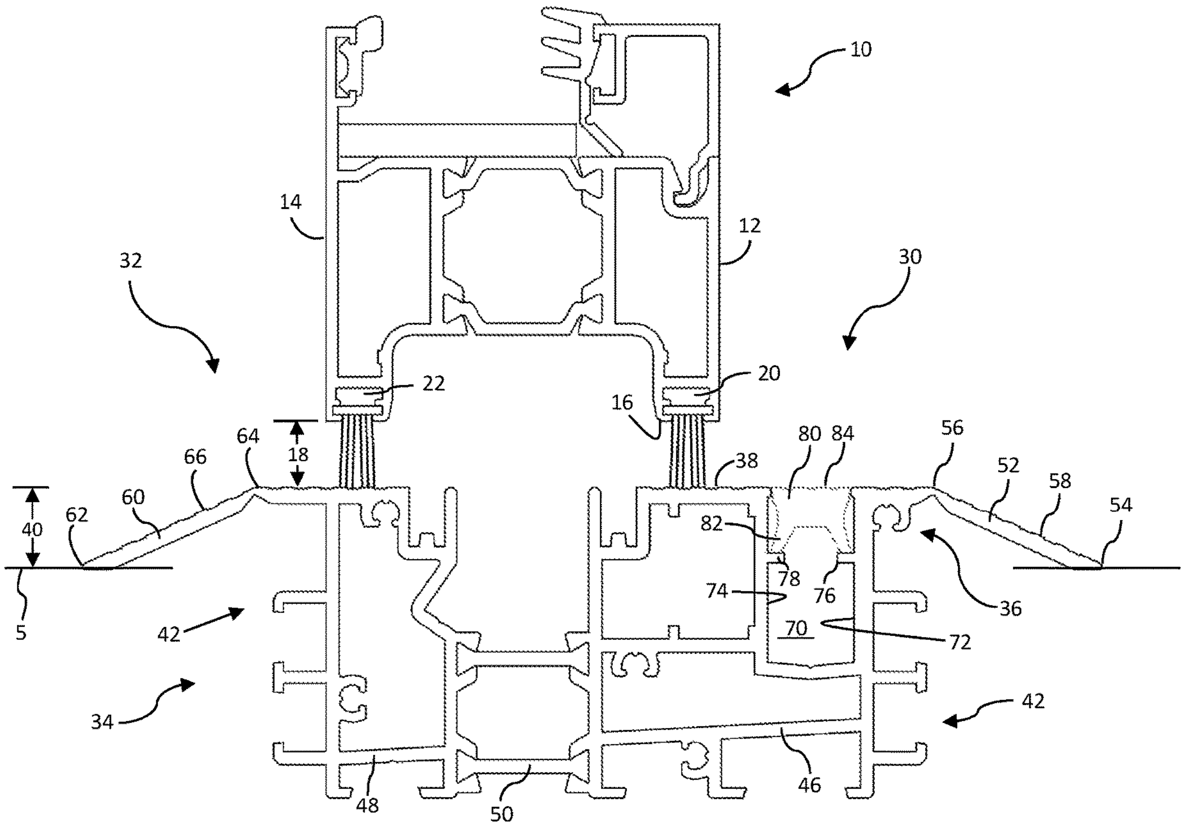
FIG. 2 is a side cross sectional view of another embodiment of the threshold sill assembly that shows another embodiment of a glass wall and shows a top surface insert engaged with the sill assembly.
Figure 3:
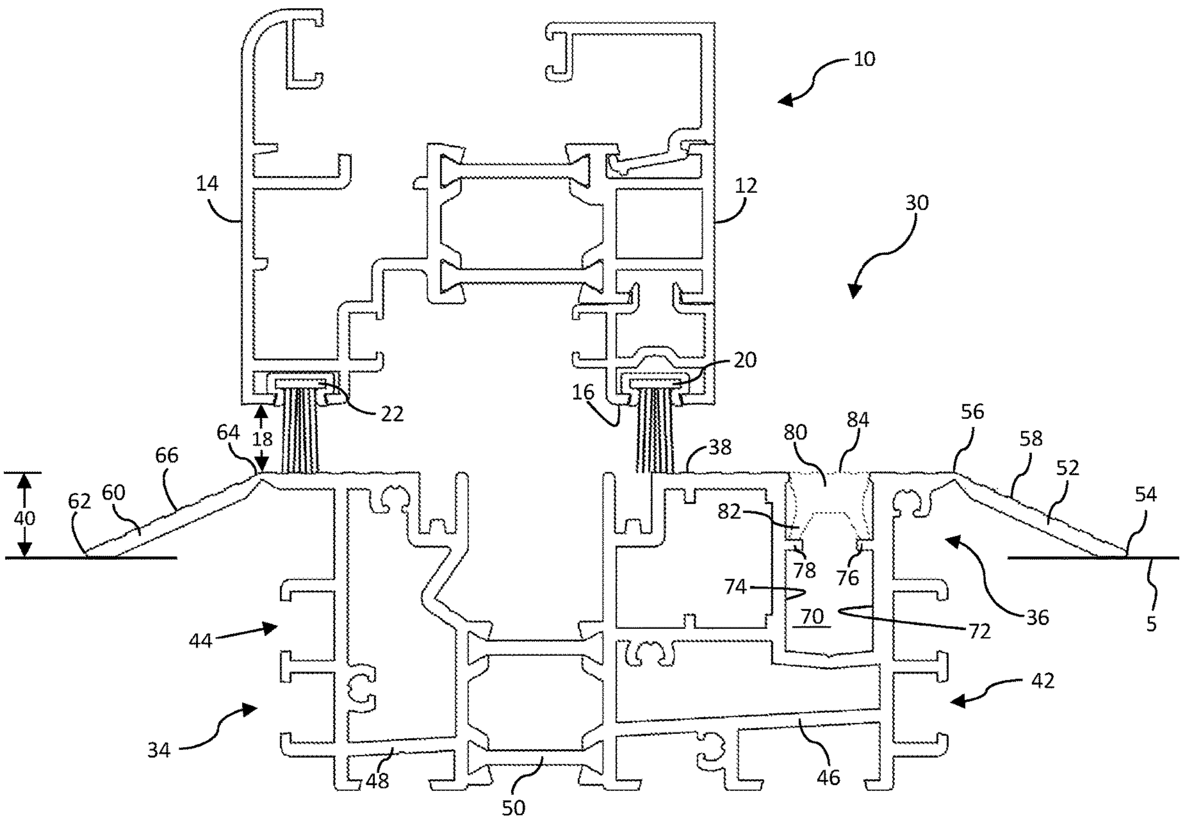
FIG. 3 is a side cross sectional view of another embodiment of the threshold sill assembly that shows one embodiment of a glass wall and shows a top surface insert engaged with the sill assembly.

Referring now to FIGS. 2 and 3, alternative embodiments of threshold sill assemblies 30 including differing glass walls 10 are shown in cooperation with the described threshold sill 32. One of skill will appreciate that the described threshold sill assembly 30 can be used with a wide variety of glass wall systems, doors, and entryways.

Figure 4:
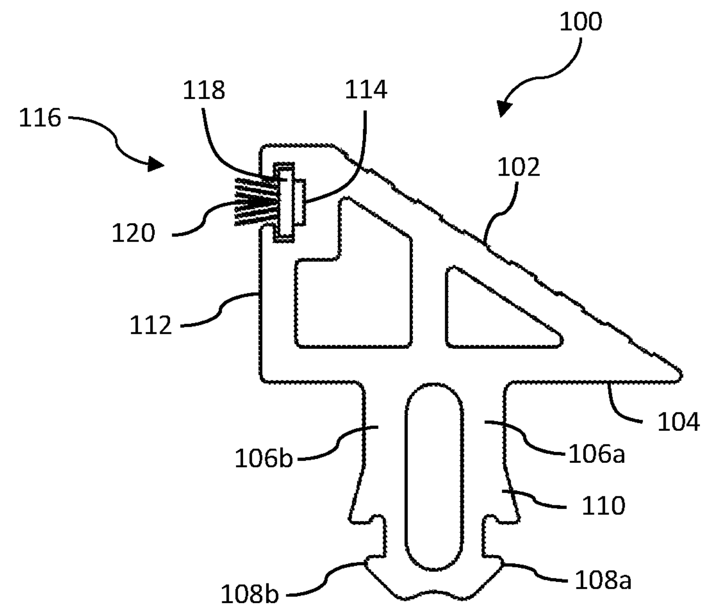
FIG. 4 is a side cross sectional view of one embodiment of a weather strip insert with one embodiment of a wall gasket.

Turning now to FIG. 4, one embodiment of a removable barrier insert 100 with one embodiment of a wall gasket 116 is shown. The removable barrier insert 100 may be removably engaged with the cavity 70 provided in the top surface 38 of the threshold sill 30. The removable barrier insert 100 generally includes a top surface 102, a bottom 104, and a portion 112 that, when the removable barrier insert 100 is inserted into the cavity, is oriented substantially parallel to the glass wall 12. In some instances, the portion 112 is configured to be substantially normal to the bottom 104. In some configurations, when the removable barrier insert 100 is engaged in the cavity 70, the top surface 102 of the removable barrier insert 100 is substantially aligned and contiguous with the top surface 58 of the first ramp 52 to provide an aesthetically pleasing configuration.

The removable barrier insert 100 may have any suitable length which may include a length such that the removable barrier insert 100 may extend the entire span of the threshold sill 30. In some instances the removable barrier insert 100 may have a single continuous length or may have a length less than the entire length of the threshold sill 30. In the latter instance, the removable barrier insert 100 may have any suitable length and may then be arranged end to end to form a continuous removable barrier.

The removable barrier insert 100 has a bottom 104 from which at least one finger 106 extends and, in some instances has a first finger **106*a* and a second finger 106*b* each of which has a distal end 108*a*, 108*b* that may terminate in an edge (depicted as an anchor-type shape) that may contact or engage respective retaining nubs or ribs 76, 78 to removably secure the removable barrier insert 100 within the cavity 70 and with the threshold sill 30. In some embodiments the first finger 106*a* and the second finger 106*b* may include respective first and second resilient members 110*a*, 110*b* that engage respective walls of the cavity 70*a*, 70*b* adjacent the respective first 76 and second 78** protrusion or rib.

When the removable barrier insert 100 is engaged in the cavity 70, the portion 112 will be substantially normal to the top surface of the sill and substantially parallel to the first side 12 of the glass wall 10 and may be spaced from the first side 12 of the glass wall 10 a distance equal to or less than 0.125 inches. When inserted into the cavity 70, the removable barrier insert 100 substantially prevents water intrusion past the movable glass wall 10, i.e., in the direction from the second side 14 to the first side 12. In addition, it will be appreciated that the removable barrier insert 100 can act as a barrier to other environmental conditions such as air and sound.

To further enhance the effectiveness of the removable barrier insert 100, the portion 112 of the removable barrier insert 100 normal to the bottom 104 (and that may be parallel to the first side 12 of glass wall 10) is provided with a channel 114 that is generally oriented substantially parallel to the floor 5 and that is configured to receive a wall gasket 116. The wall gasket 116 has a protrusion 118 that engages the channel 114 and an outward portion 120 that contacts a portion of the first side 12 of the glass wall 10 to help seal the opening between the glass wall 10 and the threshold sill 30.

The removable barrier insert 100 and wall gasket 116 may be fabricated from the same or different material. Generally, the removable barrier insert 100 and wall gasket 116 may be fabricated from any material that is resistant to environmental elements (e.g., heat, oxidation, ozone and weather aging) and has flexible characteristics. In an embodiment, the wall gasket is fabricated from natural or synthetic materials such as polypropylene. Suitable polypropylene materials include, but are not limited to, ethylene-propylene rubbers and elastomers (also called EPDM and EPM). Ethylenepropylene rubbers are valuable for their excellent resistance to heat, oxidation, ozone and weather aging due to their stable, saturated polymer backbone structure.

Those skilled in the art will recognize that many materials are suitable for use in fabricating the removable barrier insert 100 and the wall gasket 116 and are within the scope and spirit of the presently disclosed embodiments. For example, the removable barrier insert 100 may be formed from metal, such as aluminum, plastic such as vinyl, and combinations of material.

Figure 5:
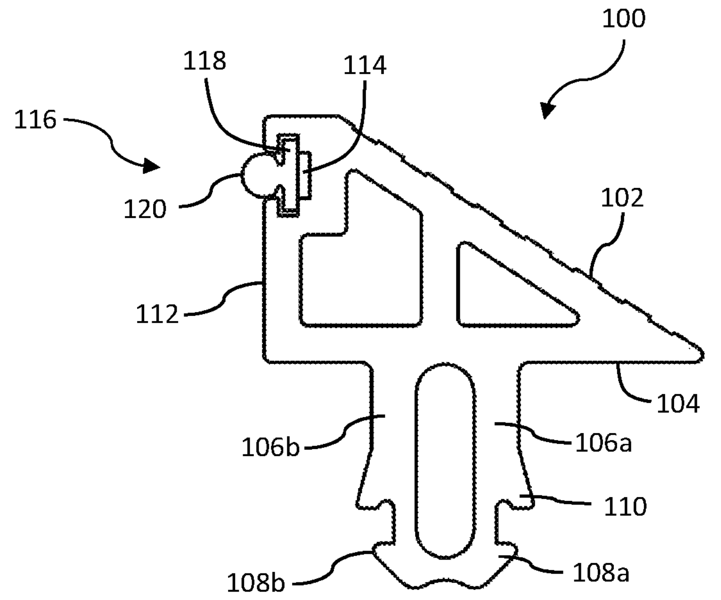
FIG. 5 is a side cross sectional view of the removable barrier insert shown in FIG. 4 with another embodiment of a wall gasket.
Figure 6:
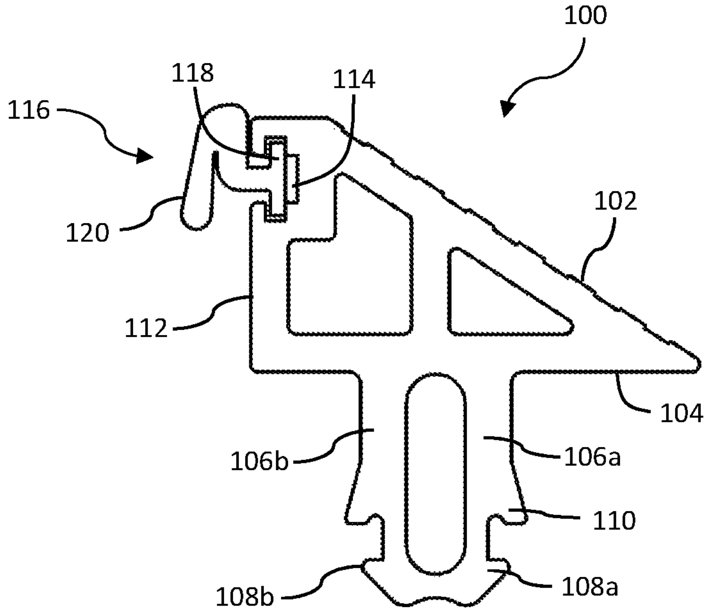
FIG. 6 is a side cross sectional view of the removable barrier insert shown in FIG. 4 with another embodiment of a wall gasket.
Figure 7:
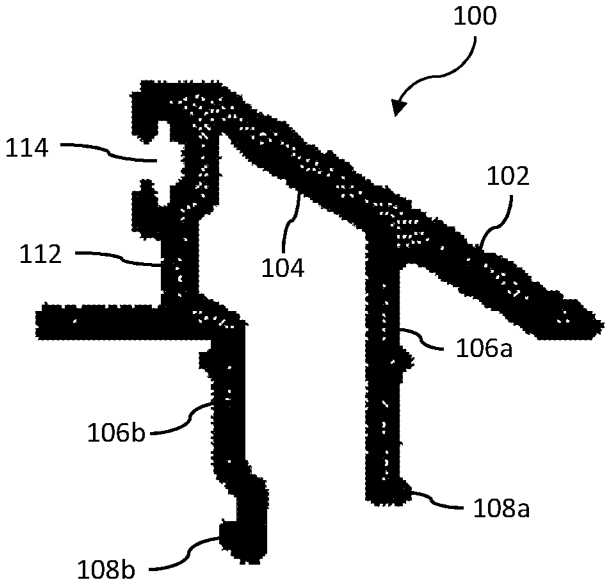
FIG. 7 is a side cross sectional view of another embodiment of a removable barrier insert.
Figure 8:
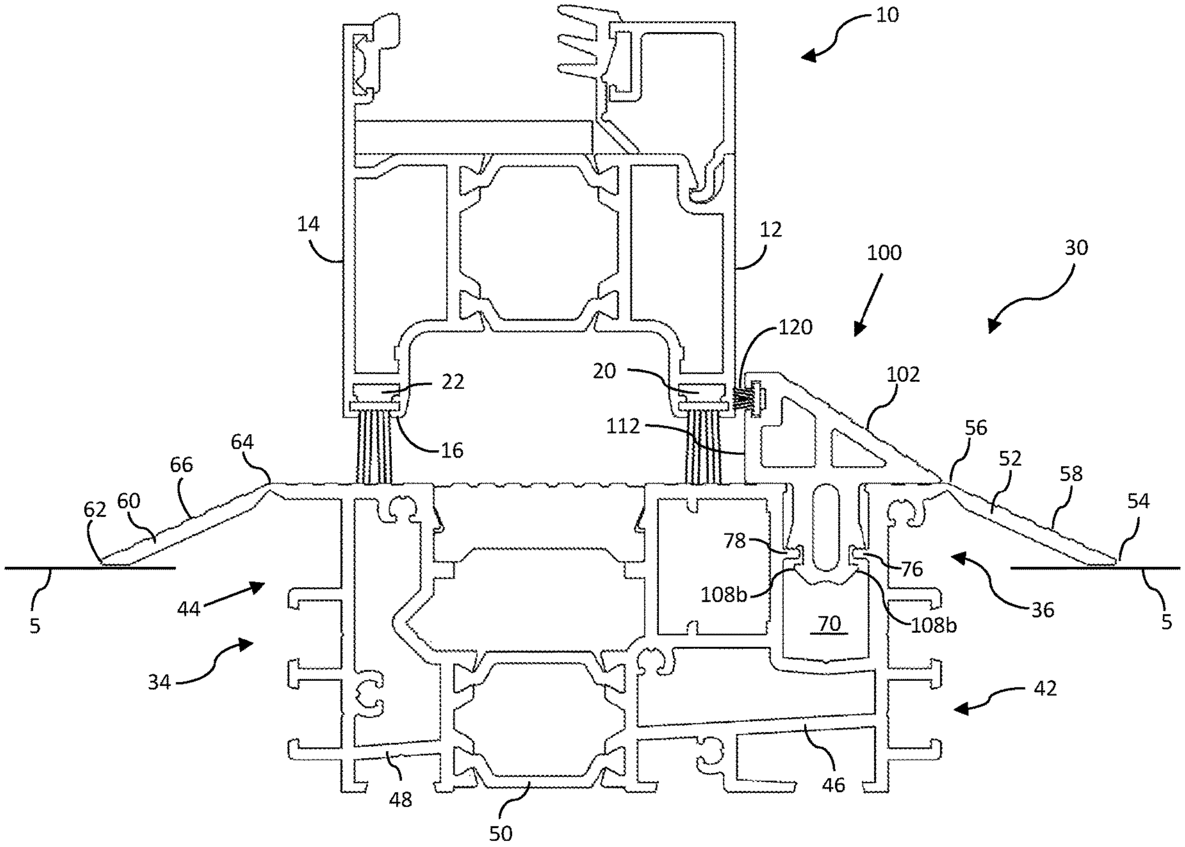
FIG. 8 is a side cross sectional view the threshold sill assembly shown in FIG. 1 with the removable barrier insert of FIG. 4 engaged with the sill assembly and with the wall gasket shown in FIG. 4.
Figure 9:
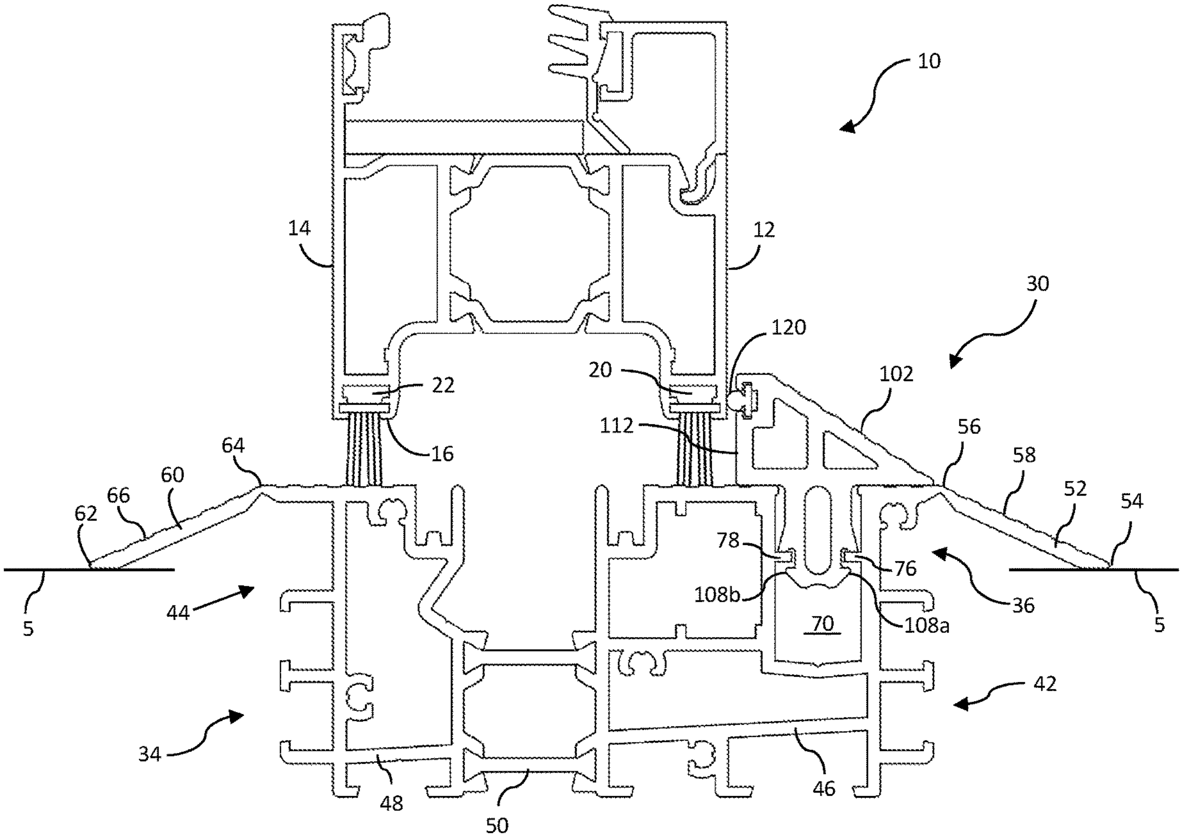
FIG. 9 is a side cross sectional view of the threshold sill assembly shown in FIG. 2 with the removable barrier insert of FIG. 5 engaged with the sill assembly and with the wall gasket shown in FIG. 5.
Figure 10:
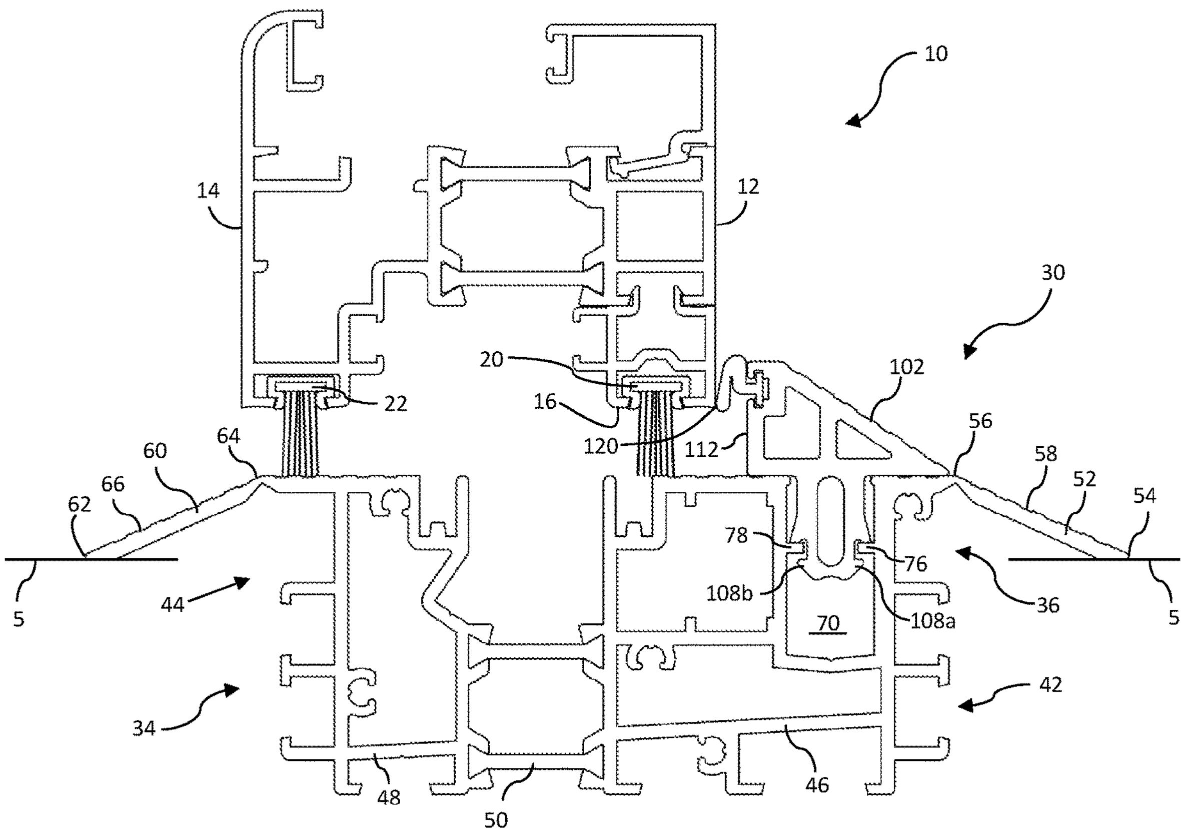
FIG. 10 is a side cross sectional view of the threshold sill assembly shown in FIG. 3 with the removable barrier insert of FIG. 6 engaged with the sill assembly and with the wall gasket shown in FIG. 6.
Figure 11:
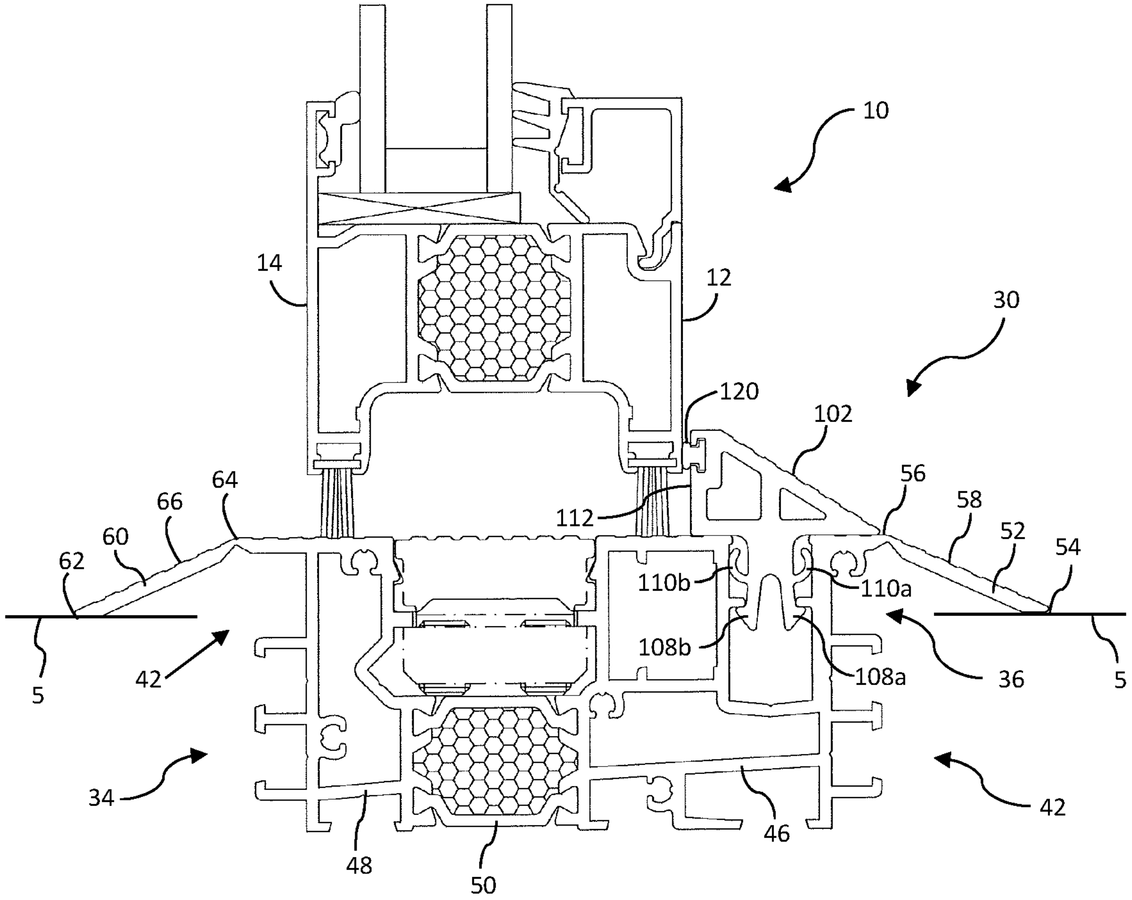
FIG. 11 is a side cross sectional view of the threshold sill assembly shown in FIG. 1 with another embodiment of a removable barrier insert engaged with the sill assembly and with another embodiment of a wall gasket shown.
Figure 12:
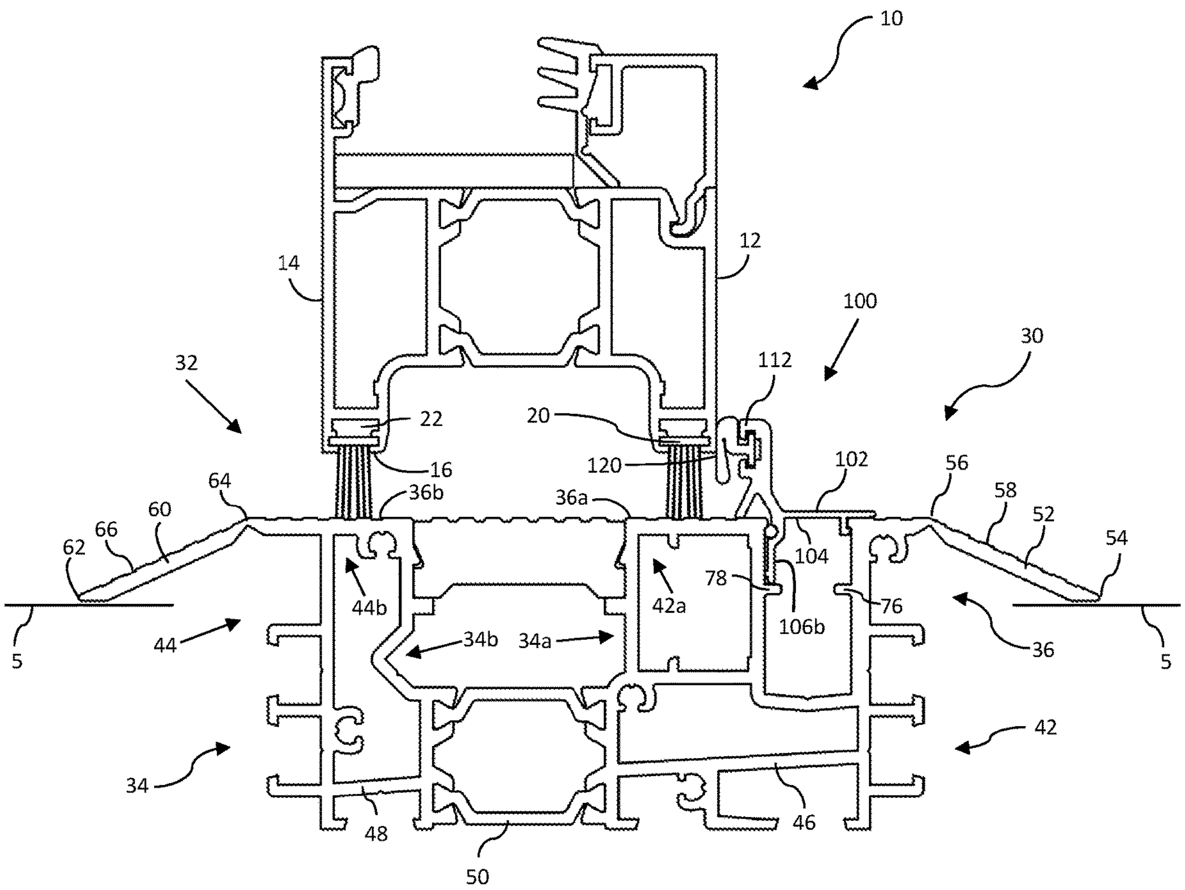
FIG. 12 is a side cross sectional view of the threshold sill assembly shown in FIG. 1 with another embodiment of a removable barrier insert engaged with the sill assembly and with the wall gasket shown in FIG. 6.
Figure 13:
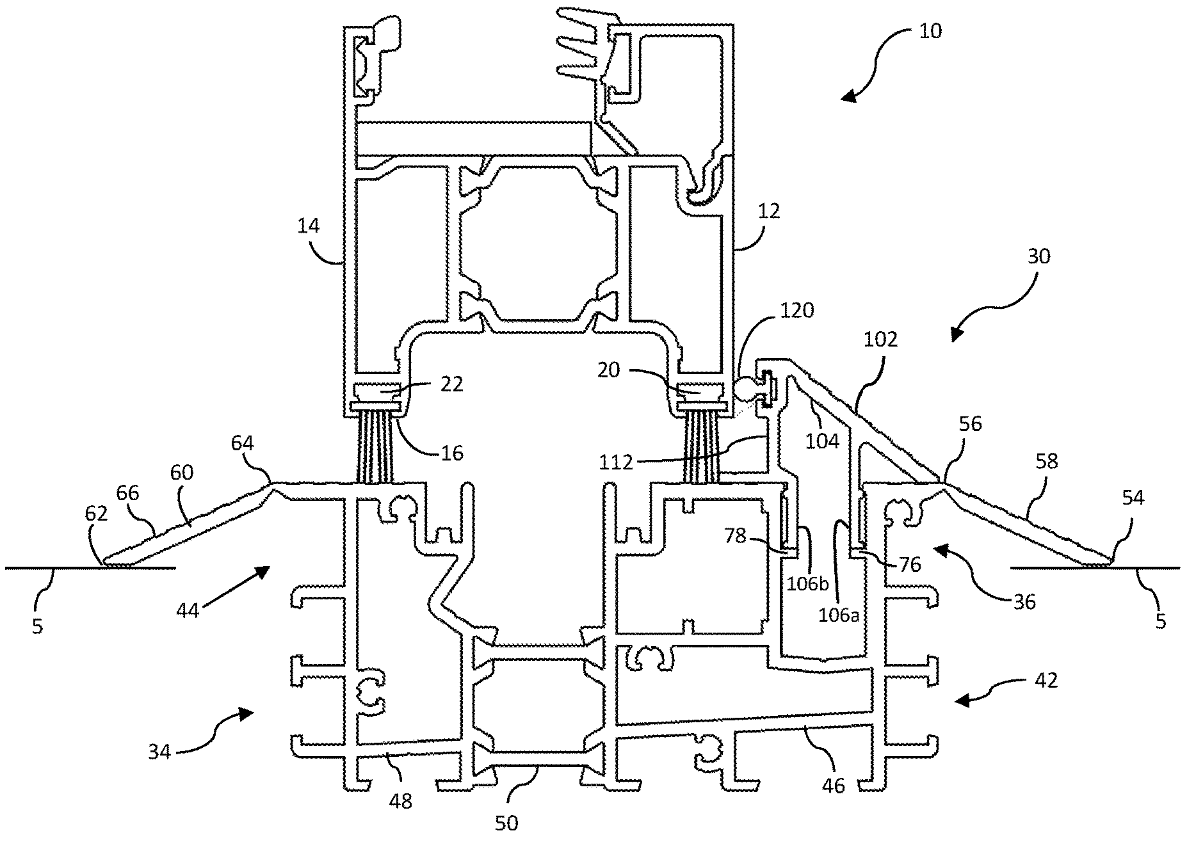
FIG. 13 is a side cross sectional view of the threshold sill assembly shown in FIG. 2 with another embodiment of a removable barrier insert engaged with the sill assembly and with the wall gasket shown in FIG. 5.
Figure 14:
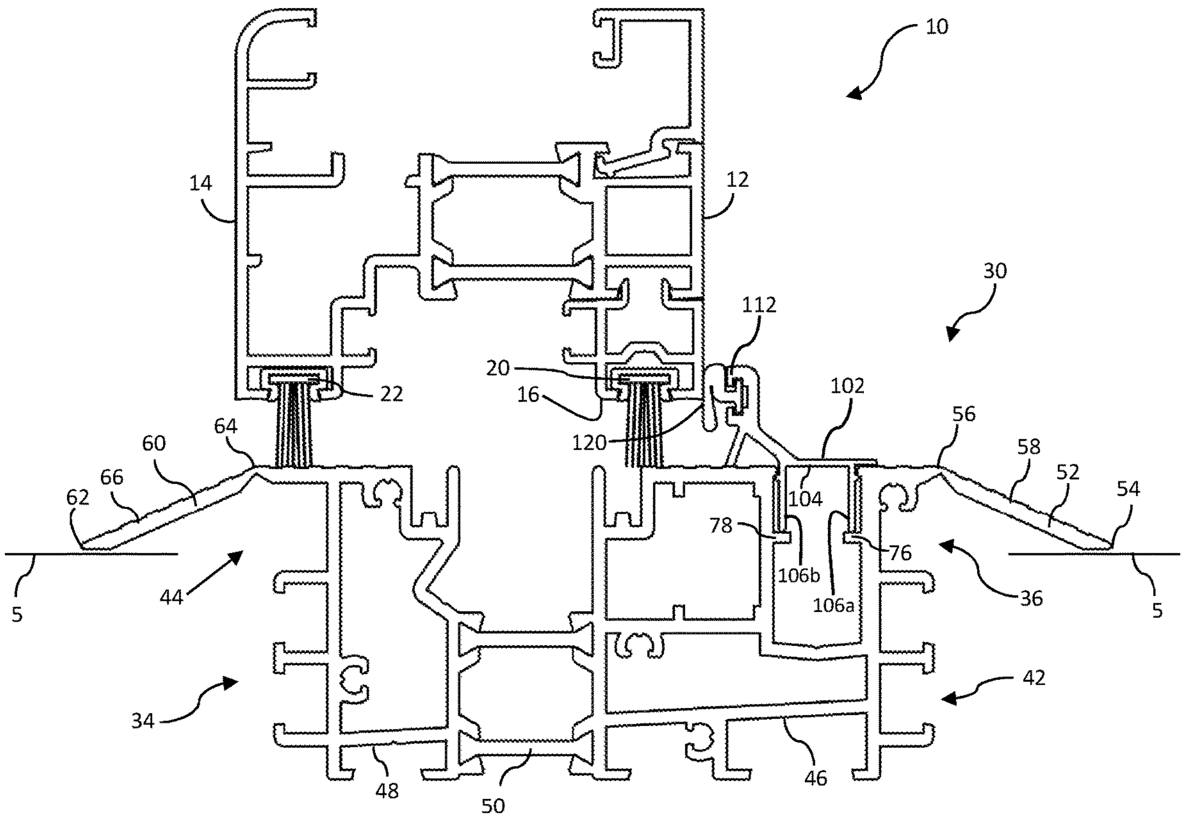
FIG. 14 is a side cross sectional view of the threshold sill assembly shown in FIG. 3 with another embodiment of a removable barrier insert engaged with the sill assembly and with the wall gasket shown in FIG. 6.
Figure 15:
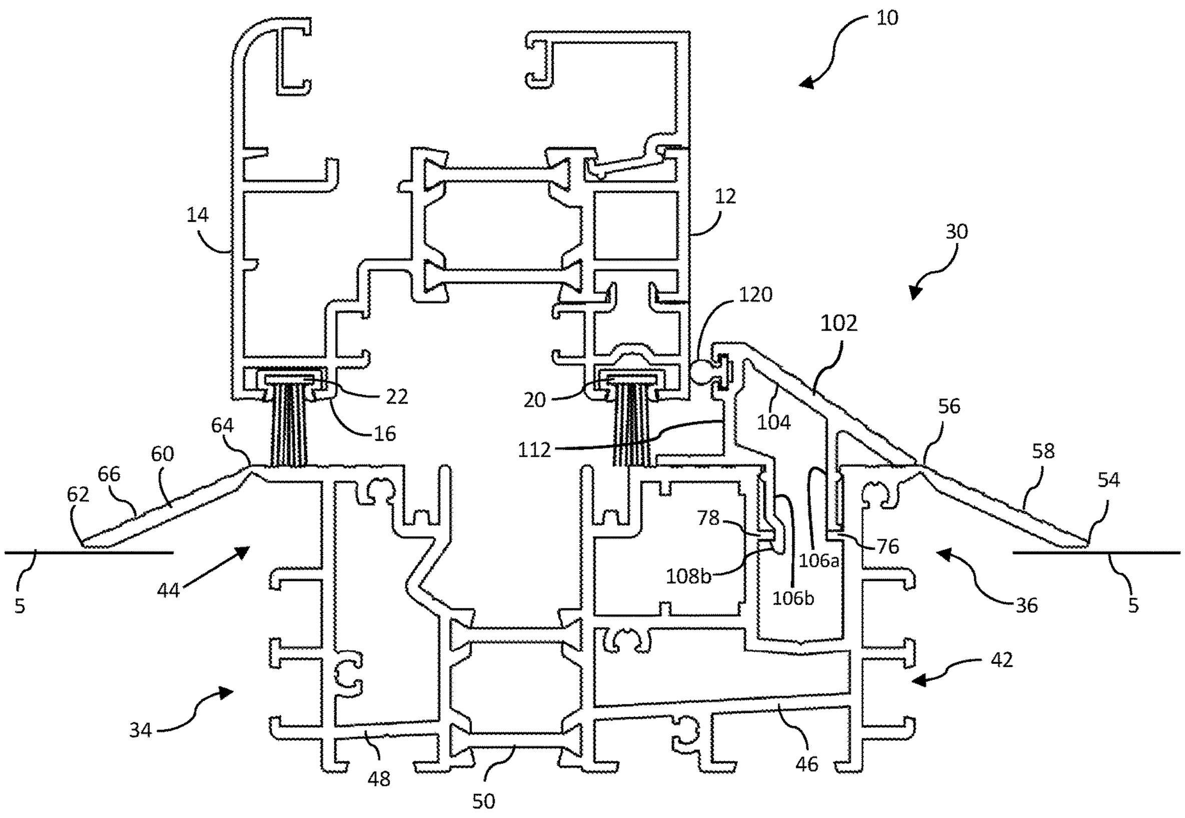
FIG. 15 is a side cross sectional view of the threshold sill assembly shown in FIG. 3 with another embodiment of a removable barrier insert engaged with the sill assembly and with the wall gasket shown in FIG. 5.
Figure 16:
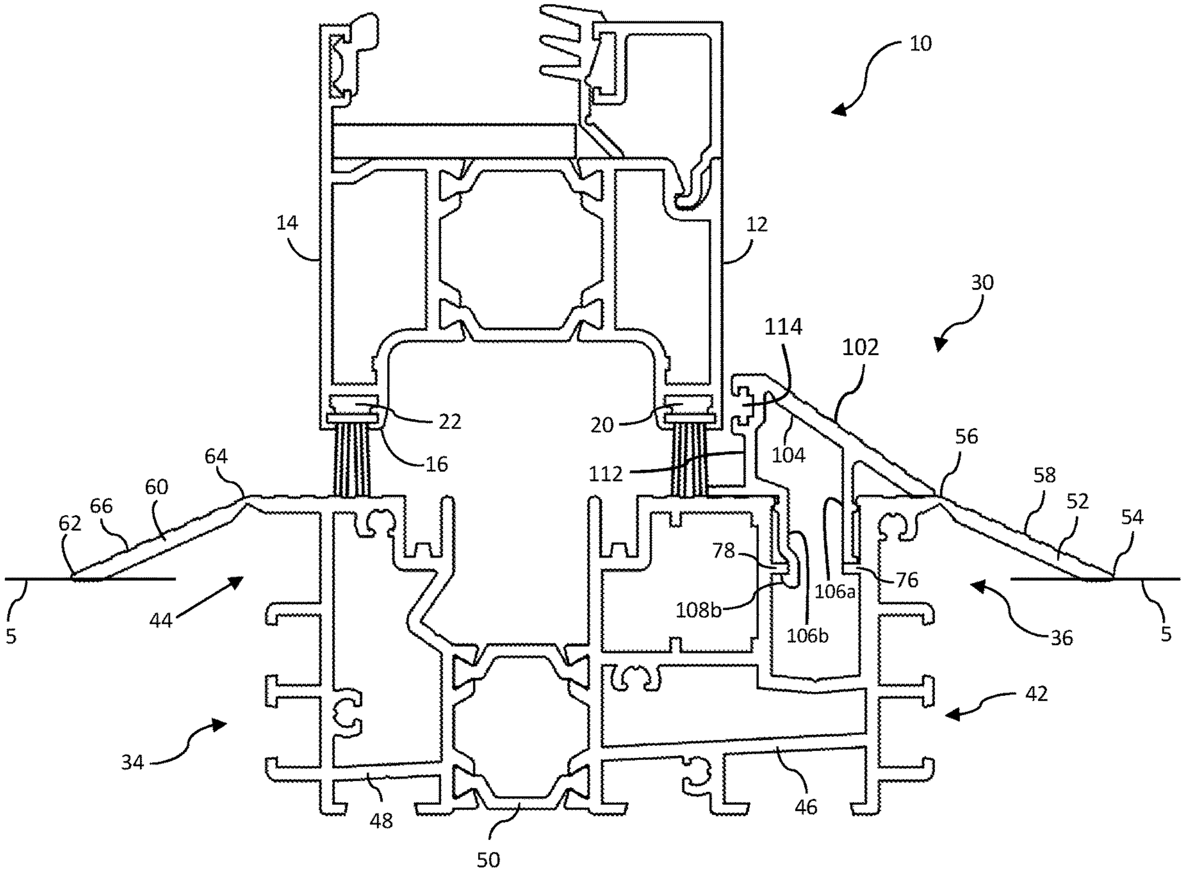
FIG. 16 is a side cross sectional view of the threshold sill assembly shown in FIG. 2 with the removable barrier insert of FIG. 7 engaged with the sill assembly and no wall gasket.
Figure 17:
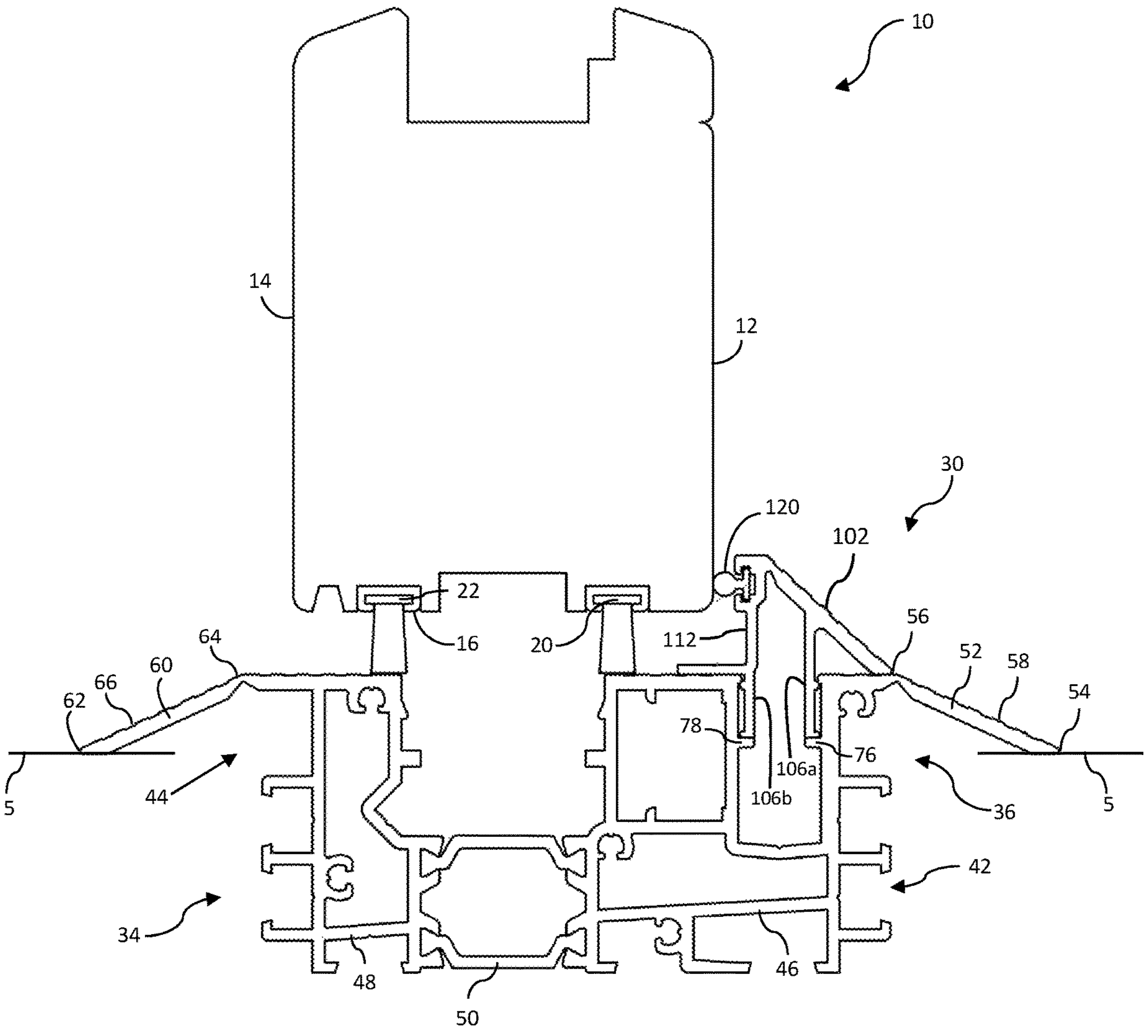
FIG. 17 is a side cross sectional view of another embodiment of a threshold sill assembly with the removable barrier insert shown in FIG. 13 engaged with the sill assembly and with the wall gasket shown in FIG. 5.
Figure 18:
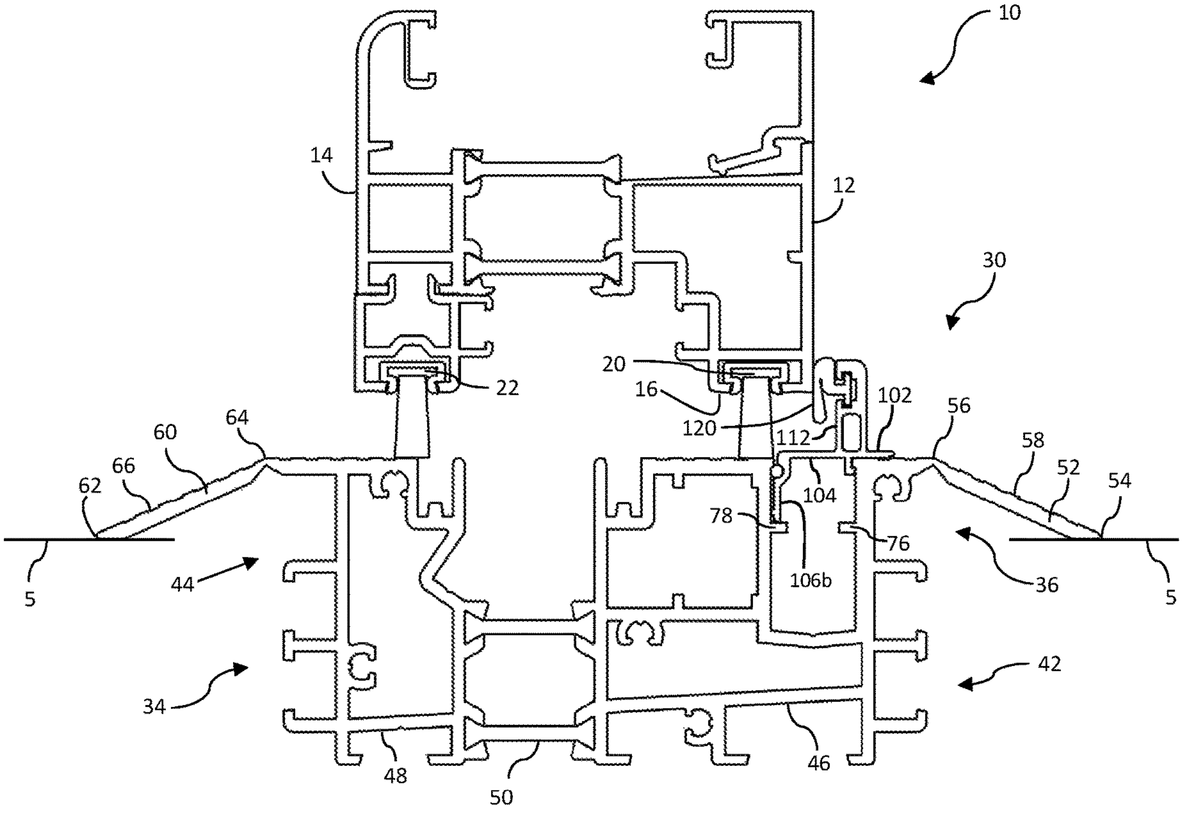
FIG. 18 is a side cross sectional view of another embodiment of a threshold sill assembly with another embodiment of a removable barrier insert engaged with the sill assembly and with the wall gasket shown in FIG. 6.
Figure 19:
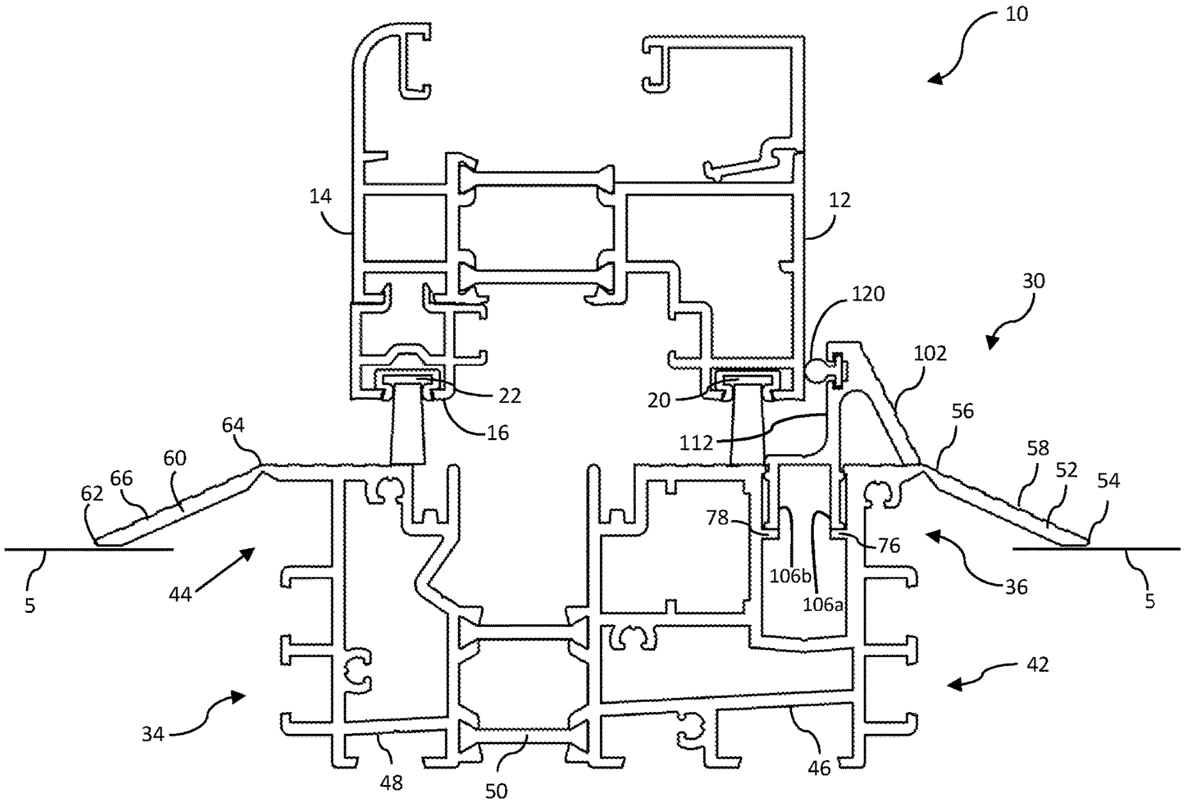
FIG. 19 is a side cross sectional view of the threshold sill assembly shown in FIG. 18 with another embodiment of a removable barrier insert engaged with the sill assembly and with the wall gasket shown in FIG. 5.
Figure 20:
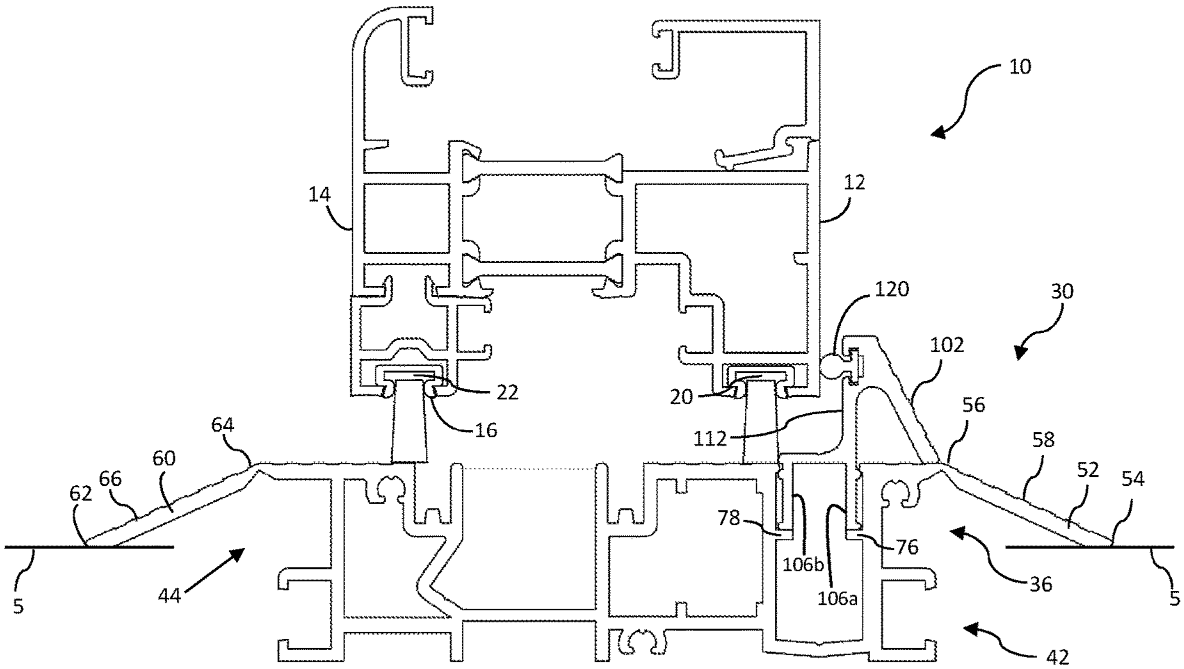
FIG. 20 is a side cross sectional view of another embodiment of a threshold sill assembly with the removable barrier insert shown in FIG. 19 engaged with the sill assembly and with the wall gasket shown in FIG. 5.

FIGS. 5 and 6 show a removable barrier insert 100 that is the same as that shown in FIG. 4 but with different configurations of a wall gasket 116. One of skill will appreciate that the wall gasket may have any suitable shape so that it achieves the functions described above. FIG. 7 shows another embodiment of a removable barrier insert 100 without a wall gasket 116 not inserted or engaged in the channel 114.

FIGS. 8-20 show different embodiments of glass wall systems having a glass wall 10 in cooperation with the threshold sill assembly 30 with a removable barrier insert 100 and a wall gasket 116 as described above. Viewing the figures, one of skill will appreciate that the removable barrier insert 100 may have varying configurations so long as those configurations are capable of achieving the above described functions. Similarly, the wall gasket 116 may have varying configurations so long as those configurations are capable of achieving the above described functions. Also, it will be appreciated that many different combinations of removable barrier inserts 100 and wall gaskets 116 suitable to achieve the objectives of the described removable barrier insert 100 and wall gasket 116 are contemplated.

Figure 21:
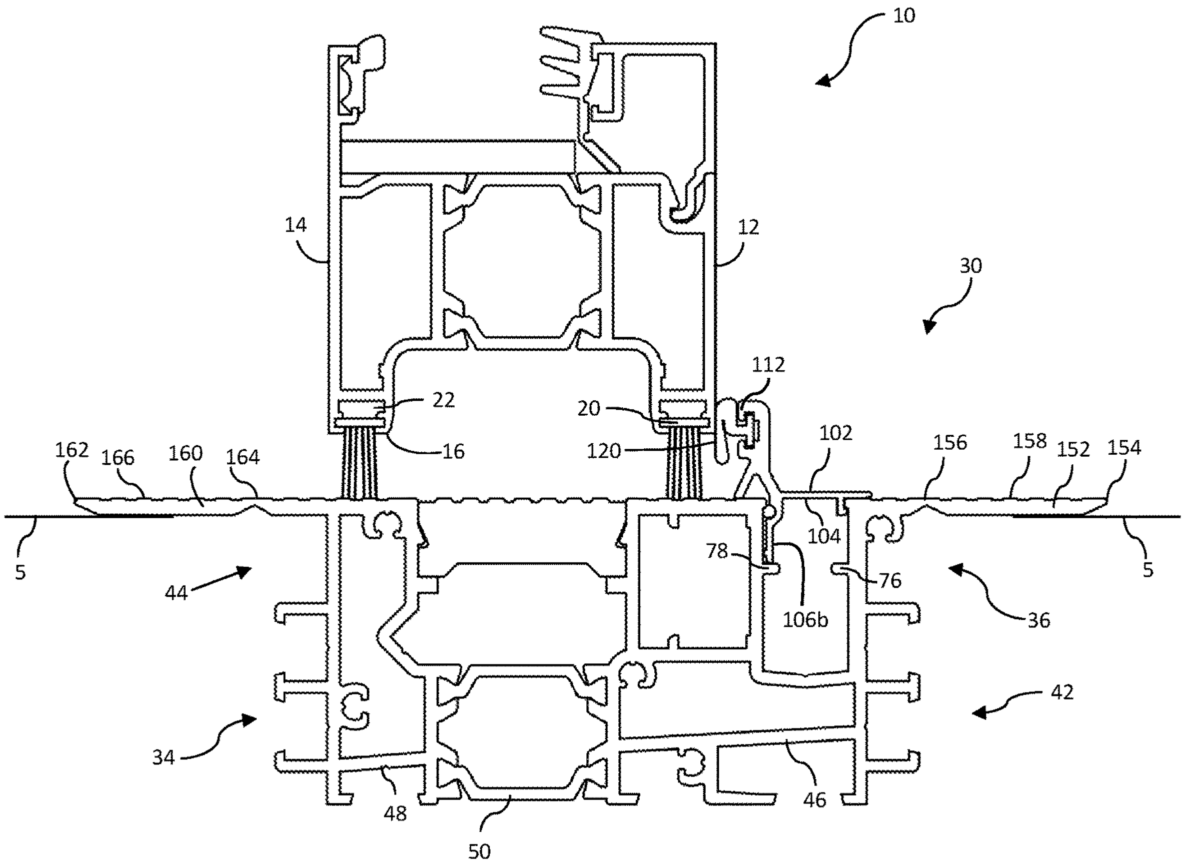
FIG. 21 is a side cross sectional view of another embodiment of a threshold sill assembly with the removable barrier insert shown in FIG. 12 engaged with the sill assembly and with the wall gasket shown in FIG. 6.

Turning now to FIG. 21, another embodiment of a glass wall system having a glass wall 10 in cooperation with the threshold sill assembly 30 with a removable barrier insert 100 and a wall gasket 116 is shown. Like parts are described with like reference numeral. In this embodiment, it will appreciated that the first ramp 152 and the second ramp 160 are not sloped. Rather, the top surface 158 and 166 of the first 152 and second 160 ramp, respectively, are contiguous with (lie in the same plane as) the top surface 38 of the threshold sill 32. In some instances, the top surface 158 and 166 of the first 152 and second 160 ramp, respectively, are spaced from the floor 5 a distance equal to or less than 0.25 inch. In other embodiments (not shown) the top surface 158 and 166 of the first 152 and second 160 ramp, respectively, are flush with the floor 5.

While one configuration of a barrier insert 100 and wall gasket 116 is shown, one of skill will appreciate that any of the other described and shown barrier inserts (as well as other barrier inserts capable of performing the described functions) may be used with the threshold sill 30 of FIG. 21. Similarly, one of skill will appreciate that any of the other described and shown wall gaskets (as well as other wall gaskets capable of performing the described functions) may be used with the barrier insert of FIG. 21.

Advantageously, use of the removable barrier insert 100 described above is believed to lead to improved performance in respect of air infiltration and water penetration as compared to known profile saddle sills without the removable barrier insert 100 described above (e.g., NanaWall Low Profile Saddle Sill, SL60). For example, regarding air infiltration as measured by ASTM E-283 ($ft^3$/min./ft) (in accordance with NFRC 400) at 1.57 psf, use of the removable barrier insert described above is expected to reduce air infiltration from 0.08 to 0.02 and at 6.24 psf use of the removable barrier insert described above is expected to reduce air infiltration from 0.17 to 0.10.

Similarly, with respect to water infiltration as measured by ASTM E-547 and E-331, use of the removable barrier insert described above is expected to reduce no uncontrolled water penetration from 2.1 psf (with weep holes from middle channel) or 5.43 psf (with weep holes from inner channel) to 7.5 psf (with weep holes).

With the above in mind, one of skill will appreciate that when the glass wall or walls are in a "closed" configuration, the top surface insert 80 may be removed and replaced with the removable barrier insert 100 to provide the desired weather protection. Similarly, when it is desired to move the glass wall or walls to an "open" configuration, the removable barrier insert 100 may be removed and replaced with the top surface insert 80 to provide an accessible entryway that may be ADA compliant. Advantageously, when the removable barrier insert 100 is engaged with a threshold sill 32, the door or glass wall 10 may still be opened in a direction away from the removable barrier sill to provide the aesthetic appeal of an open air environment even though it may not provide an ADA compliant entryway.

As used in this description, the term "removable barrier insert" refers to a material or device used to prevent or hinder the passage of environmental conditions such as air, water, and sound from passing through the entryway either by blocking it outright or by blocking most of it and returning or rerouting it. A secondary goal of a removable barrier may be to keep interior air in, thus saving energy with heating and air conditioning.

As used in this description, the term "movable glass wall" refers to doors and folding walls that typically contain but need not contain glass. Examples of such can be seen at https://www.nanawall.com.

As used in this description, the term "ramped saddle" or "saddle sill" refers to a threshold for an entryway that has an angled top surface on at least one of the interior and exterior (and generally on both) and meets ADA accessibility guidelines.

As used in this description, the term "Americans with Disabilities Act" or "ADA" means the civil rights law that prohibits, under certain circumstances, discrimination based on disability. Disability is defined as "a physical or mental impairment that substantially limits a major life activity." According to the current ADA Accessibility Guidelines, Section 4.13.8, Thresholds at Doorways, "Thresholds at doorways shall not exceed ¾ inch (19 mm) in height for exterior sliding doors . . . . Raised thresholds and floor level changes at accessible doorways shall be beveled with a slope no greater than 1:2."

As used in this description, the term "floor" is meant to encompass any structure on either side of an entryway and it may include but is not limited to a sidewalk, an entrance doorway, an egress between differing types of floor surfaces etc.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A threshold sill assembly comprising:

a. a sill having a top surface substantially parallel to and spaced from a floor a distance no more than 0.75 inches, the sill having a lower portion partially recessed within the floor;

b. a first ramp on a first side of the sill, the first ramp has a top surface with a distal end adjacent to the floor and a proximal end adjacent the top surface of the sill, wherein the top surface of the first ramp is angled with respect to the floor;

c. a second ramp on a second side of the sill spaced from and opposite the first ramp, the second ramp has a top surface with a distal end adjacent to the floor, a proximal end adjacent the top surface of the sill, wherein the top surface of the second ramp is angled with respect to the floor; and, d. a cavity provided in the top surface of the sill;

e. a top surface insert and a barrier insert, each being configured to alternatively and removably be received in the cavity; wherein, i. the top surface insert includes a top surface and a lower portion that, when removably received in the cavity, extends into the cavity such that the top surface insert top surface lies in the same plane as the top surface of the sill and such that the lower portion removably engages with a portion of the cavity to removably secure the top surface insert within the cavity, ii. the barrier insert has a lower portion that, when removably received in the cavity, extends into the cavity and has an upstanding portion extending in a direction away from the cavity and being orthogonal to the top surface of the sill, wherein when the barrier insert is received in the cavity, the barrier insert has a portion abutting the top surface of the sill stopping movement of the barrier insert further into the cavity.

2. The threshold sill assembly of claim 1 wherein the cavity has a first wall spaced from a second wall to define a width of the cavity and wherein the top surface insert extends the width of the cavity.

3. A threshold sill assembly comprising:

a. a sill having a top surface orthogonal to a glass wall, substantially parallel to and spaced from a floor a distance no more than 0.75 inches and a lower portion partially recessed within the floor;

b. a first ramp on a first side of the sill, the first ramp has a top surface with a distal end adjacent to the floor and a proximal end adjacent the top surface of the sill, wherein the top surface of the first ramp is angled with respect to the floor;

c. a second ramp on a second side of the sill spaced from and opposite the first ramp, the second ramp has a top surface with a distal end adjacent to the floor, a proximal end adjacent the top surface of the sill, wherein the top surface of the second ramp is angled with respect to the floor; and, d. a cavity provided in the top surface of the sill;

e. a top surface insert and a barrier insert, each being configured to alternatively and removably be received in the cavity; wherein, i. the top surface insert includes a top surface and a lower portion that, when removably received in the cavity, extends into the cavity such that the top surface insert top surface lies in the same plane as the top surface of the sill and such that the lower portion removably engages with a portion of the cavity to removably secure the top surface insert within the cavity, and ii. the barrier insert has a lower portion that, when removably received in the cavity, extends into the cavity and has an upstanding portion extending in a direction away from the cavity and orthogonal to the top surface of the sill, wherein when the barrier insert is received in the cavity, the barrier insert has a portion abutting the top surface of the sill stopping movement of the barrier insert further into the cavity.

* * * * *